United States Patent
Ok et al.

(10) Patent No.: US 11,836,529 B2
(45) Date of Patent: Dec. 5, 2023

(54) ITERATIVE WORKLOAD PROCESSING HAVING A MANDATORY PROCESSING TASK AND A PREFERRED PROCESSING TASK

(71) Applicant: Red Hat, Inc., Raleigh, NC (US)

(72) Inventors: Ali Ok, Istanbul (AR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 683 days.

(21) Appl. No.: 16/717,159

(22) Filed: Dec. 17, 2019

(65) Prior Publication Data

US 2021/0182112 A1 Jun. 17, 2021

(51) Int. Cl.
| | | |
|---|---|---|
| A63F 9/24 | (2006.01) | |
| G06F 9/50 | (2006.01) | |
| A63F 13/35 | (2014.01) | |
| A63F 13/69 | (2014.01) | |
| A63F 13/577 | (2014.01) | |

(52) U.S. Cl.
CPC ............ *G06F 9/5038* (2013.01); *A63F 13/35* (2014.09); *A63F 13/577* (2014.09); *A63F 13/69* (2014.09)

(58) Field of Classification Search
CPC .............................. G06F 11/3006; G06F 11/34
See application file for complete search history.

(56) References Cited

U.S. PATENT DOCUMENTS

| | | | |
|---|---|---|---|
| 7,739,479 | B2 | 6/2010 | Bordes et al. |
| 7,796,128 | B2 | 9/2010 | Radzikowski et al. |
| 2007/0281285 | A1* | 12/2007 | Jayaweera ............... G09B 7/02 434/188 |
| 2017/0032055 | A1* | 2/2017 | Eisemann ............... G06F 17/10 |
| 2017/0032579 | A1* | 2/2017 | Eisemann ............. G06T 17/205 |

FOREIGN PATENT DOCUMENTS

CN 104833987 B 3/2016

OTHER PUBLICATIONS

Author Unknown, "Time and Framerate Management," Unity User Manual, Version 2018.4, Oct. 22, 2019, Unity Technologies, 7 pages.

(Continued)

*Primary Examiner* — David L Lewis
*Assistant Examiner* — Eric M Thomas
(74) *Attorney, Agent, or Firm* — Dority & Manning, P.A.

(57) ABSTRACT

Iterative workload processing having a mandatory processing task and a preferred processing task. A processor device iteratively performs a processing workload that comprises a mandatory processing task and a preferred processing task. The mandatory processing task includes accessing a plurality of input messages that have not yet been processed, and the preferred processing task has a target timeframe within which to be performed. For each iteration, a maximum preferred processing task amount of time to perform the preferred processing task is determined based on a moving average of mandatory processing task times of previous iterations and based on the target timeframe. The preferred processing task is performed for a period of time no greater than the maximum preferred processing task amount of time.

20 Claims, 8 Drawing Sheets

(56) References Cited

OTHER PUBLICATIONS

Author Unknown, "Let's talk about Game Loop," Nitwoe's Dev Blog, dev.nitwoe.com/2016/03/04/lets-talk-about-game-loop/, Mar. 4, 2016, 6 pages.
Joselli, Mark, et al., "An Architecture with Automatic Load Balancing and Distribution for Digital Games," Brazilian Symposium on Games and Digital Entertainment, Nov. 2010, IEEE Computer Society, pp. 59-70.
Zamith, Marcelo, et al., "The GPU Used as a Math Co-Processor in Real Time Applications," Computers in Entertainment, vol. 6, Issue 3, 2007, 7 pages.
Author Unknown, "Game Loop," gameprogrammingpatterns.com/game-loop.html, Robert Nystrom, 2014, 17 pages.
Author Unknown, "Game Loop: Fixed timestamp, Variabl rendering," Coding and Game Design Discussion Forum, html5gamedevs.com/topic/8716-game-loop-fixed-timestep-variable-rendering, Aug. 21, 2014, Photon Storm Ltd, 9 pages.

* cited by examiner

ITERATIVE WORKLOAD PROCESSING HAVING A MANDATORY PROCESSING TASK AND A PREFERRED PROCESSING TASK

BACKGROUND

Certain types of workloads are performed iteratively, sometime tens, hundreds, or thousands of times a second, wherein both a mandatory processing task and a non-mandatory processing task, referred to herein as a preferred processing task, are to be accomplished within a target timeframe.

SUMMARY

The examples disclosed herein implement iterative workload processing having a mandatory processing task and a preferred processing task, wherein the preferred processing task is performed for a variable amount of time based on a moving average of mandatory processing task times. In particular, the examples implement a workload processing loop wherein a moving average of mandatory processing task times is maintained, and the preferred processing task time for each workload processing loop varies based on the moving average of mandatory processing task times. Thus, the examples disclosed herein minimize substantial differences in times to perform successive workload processing loops even when the mandatory processing task times of successive workload processing loops greatly vary. Among other advantages, this eliminates wide variations in responsiveness to users.

In one embodiment a method is provided. The method includes iteratively performing, by a processor device, a processing workload that comprises a mandatory processing task and a preferred processing task, the mandatory processing task comprising accessing a plurality of input messages that have not yet been processed, and the preferred processing task having a target timeframe within which to be performed. The method further includes, for each iteration, determining a maximum preferred processing task amount of time to perform the preferred processing task based on a moving average of mandatory processing task times of previous iterations and based on the target timeframe. The method further includes performing the preferred processing task for a period of time no greater than the maximum preferred processing task amount of time.

In another embodiment a computing device is provided. The computing device includes a memory and a processor device coupled to the memory. The processor device is to iteratively perform, by an application server, a processing workload that comprises a mandatory processing task and a preferred processing task, the mandatory processing task comprising accessing a plurality of input messages that have not yet been processed, and the preferred processing task having a target timeframe within which to be performed. The processor device is further to, for each iteration, determine a maximum preferred processing task amount of time to perform the preferred processing task based on a moving average of mandatory processing task times of previous iterations and based on the target timeframe. The processor device is further to perform the preferred processing task for a period of time no greater than the maximum preferred processing task amount of time.

In another embodiment a computer program product is provided. The computer program product is stored on a non-transitory computer-readable storage medium and includes instructions to cause a processor device to iteratively perform a processing workload that comprises a mandatory processing task and a preferred processing task, the mandatory processing task comprising accessing a plurality of input messages that have not yet been processed, and the preferred processing task having a target timeframe within which to be performed. The instructions further cause the processor device to, for each iteration, determine a maximum preferred processing task amount of time to perform the preferred processing task based on a moving average of mandatory processing task times of previous iterations and based on the target timeframe. The instructions further cause the processor device to perform the preferred processing task for a period of time no greater than the maximum preferred processing task amount of time.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
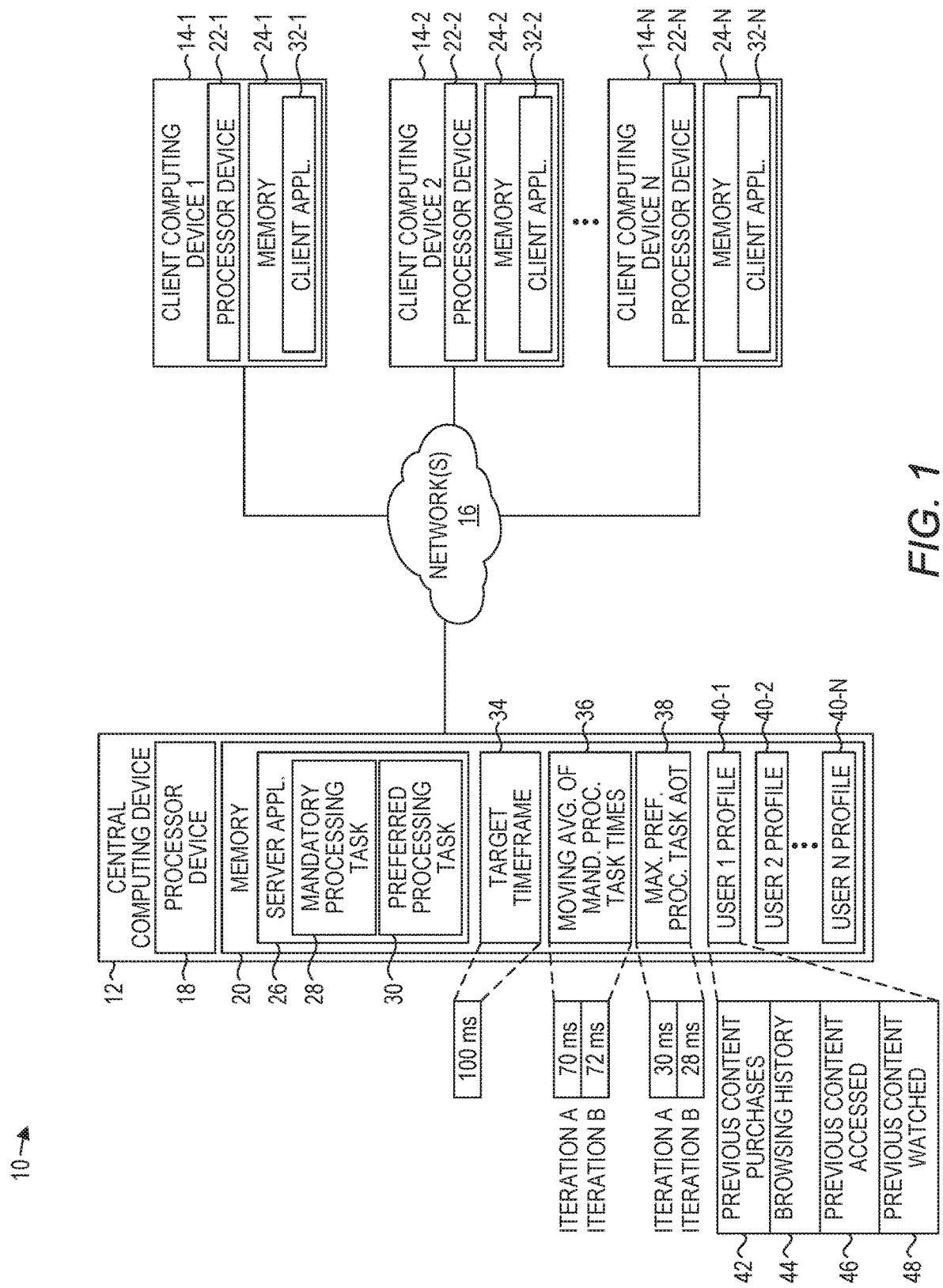
FIG. 1 is a block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Certain types of workloads are performed iteratively, sometime tens, hundreds, or thousands of times a second, wherein both a mandatory processing task and a non-mandatory processing task, referred to herein as a preferred processing task, are to be accomplished within a target timeframe.

As an example, a client-server game involves a continual processing workload loop wherein, for each processing workload loop, a game server receives a number of input messages from client game applications, processes the input messages, analyzes interactions of virtual objects in the game based on the input messages (e.g., game simulation, wherein a preferred processing task advances a virtual world model in game time steps, and concurrently simulates the physics that occur in the virtual world), and then outputs messages to the client game applications based at least in part on such interactions. This processing workload loop may have a target timeframe, for example 15 milliseconds (ms) or 30 ms, such that client game applications can be updated at a rapid rate to provide smooth game play.

Often the game simulation processing is also done iteratively within each processing workload loop, such that within a single processing workload loop, the simulation model is updated iteratively, in game time intervals. Updating a simulation model in smaller game time intervals will lead to more accuracy in collision detection, but will take more iterations, and thus a longer overall time, than larger game time intervals. For example, a game server may be configured to update the simulation model a total of 15 ms of game time each workload processing loop. The game simulation processing may operate by incrementing the simulation model in 3 ms intervals, and thus five iterations of the game simulation processing is performed each workload processing loop. The 3 ms game time interval may simply be a predetermined interval that the game developers believed was a good compromise between accuracy and timeliness.

In operation, the amount of time it takes to perform the mandatory processing task, such as accessing the input messages, processing the input messages, and sending output messages, differs depending on various criteria, such as instantaneous load on the game server, the amount of input messages received during that iteration, or the like. For example, the greater the number of input messages received, the longer the mandatory processing task will take to process the input messages and respond to the input messages. As another example, a surge in players concurrently joining a game can create a heavy load on the game server. Consequently, at times of heavy activity, performing both the mandatory processing task and the preferred processing task can take longer than the target timeframe.

Greatly exceeding the target timeframe during some workload processing loops and meeting the target timeframe during other workload processing loops results in inconsistent updating of client gaming applications, which results in lag, or other undesirable gameplay characteristics to the users.

The examples disclosed herein implement iterative workload processing having a mandatory processing task and a preferred processing task, wherein the preferred processing task is performed for a variable amount of time based on a moving average of mandatory processing task times. In particular, the examples implement a workload processing loop wherein a moving average of mandatory processing task times is maintained, and wherein the preferred processing task time for each workload processing loop varies based on the moving average of mandatory processing task times. Thus, the examples disclosed herein minimize substantial differences in times to perform successive workload processing loops even when the mandatory processing task times of successive workload processing loops greatly vary. Among other advantages, this eliminates wide variations in responsiveness to users.

FIG. 1 is a block diagram of an environment 10 in which examples disclosed herein may be practiced. The environment 10 includes a central computing device 12 that is communicatively coupled to a plurality of client computing devices 14-1-14-N (generally, client computing devices 14) via one or more networks 16. The central computing device 12 includes a processor device 18 that is communicatively coupled to a memory 20. The client computing devices 14 each include processor devices 22-1-22-N that are communicatively coupled to memories 24-1-24-N, respectively.

The central computing device 12 implements a server application 26 that iteratively handles a processing workload that comprises a mandatory processing task 28 and a preferred processing task 30 each iteration. The mandatory processing task 28 includes processing all messages received from client applications 32-1-32-N prior to each iteration, and generating output messages based on the input messages that were processed during the iteration. While for purposes of illustration only three client applications 32-1-32-N are illustrated, the number of client applications 32-1-32-N could be thousands or millions, depending on the service implemented by the server application 26.

It will be noted that because the server application 26 is a component of the central computing device 12, functionality implemented by the server application 26 may be attributed to the central computing device 12 generally. Moreover, in examples where the server application 26 comprises software instructions that program the processor device 18 to carry out functionality discussed herein, functionality implemented by the server application 26 may be attributed herein to the processor device 18.

The word "mandatory" in the term "mandatory processing task" means that each input message is processed irrespective of the number of input messages received. The particular processing of each input message may differ depending on the nature of the server application 26. In some implementations, each input message may cause the generation of an output message. In other implementations, the processing of each input message may result in output messages being generated for only some input messages. The number of input messages received each iteration may differ depending on actions of the client applications 32-1-32-N, and thus the amount of time it takes to perform the mandatory processing task 28 may differ from iteration to iteration of the processing workload loop.

The preferred processing task 30 is a processing task that affects the content of the output messages, but which varies in the amount of processing time taken each iteration to ensure sufficient time remains to send the output messages. Generally, the preferred processing task 30 comprises an analysis function which performs better as a function of the amount of processing time devoted to the preferred processing task 30. In some examples, the preferred processing task 30 may, each iteration, update a model based on the input messages being processed by the mandatory processing task 28, and generate output messages based on the updated model. In other examples, the preferred processing task 30 may, each iteration, analyze data based on each input message and, based on such analysis, generate an output message. The output messages will be more accurate the greater the amount of time the preferred processing task 30 has to analyze the model.

In this particular implementation, the server application 26 is a content streaming application that receives input messages from the client applications 32. The input messages may be a request for a content guide, a request for information about content, a request to record content, a request to pause, fast forward or reverse a recording, a request to scroll up or to scroll down through a television guide, or the like. The server application 26 performs the processing workload at some periodic rate, such as, by way of non-limiting example, 10, 20, 30, 60 or more iterations per second. In this example, the server application processes such input messages in a target timeframe 34 of 100 ms intervals. Thus, the server application 26 collects such input messages received from the client applications 32 for a 100 ms period of time, and then implements the processing workload that includes the mandatory processing task 28 and the preferred processing task 30.

The mandatory processing task 28 begins accessing the input messages received from the client applications 32. For purposes of discussion, assume that a moving average of mandatory processing task times 36 is maintained that identifies an average amount of time taken to perform the mandatory processing task 28 the previous 50 iterations of the processing workload. At the beginning of this iteration, referred to as iteration A, the moving average of mandatory processing task times 36 has a value of 70 ms. Thus, average amount of time to implement the mandatory processing task 28 over the previous fifty iterations of the processing workload was 70 ms. It should be noted that the mandatory processing task 28 may perform functionality, each iteration, both prior to the preferred processing task 30 and subsequent to the preferred processing task 30. In this example, the mandatory processing task 28 may first implement the desired operation requested from each client application 32.

After implementing the desired operations, the server application 26 determines it is time to perform the preferred processing task 30. The server application 26 then determines that a maximum preferred processing task amount of time 38 that the preferred processing task 30 may execute during iteration A is 30 ms based on the difference between the target timeframe 34 (100 ms) and the current value of the moving average of mandatory processing task times 36 at iteration A (70 ms).

The preferred processing task 30 then, for each of the input messages received from the client applications 32, generates a content recommendation. In particular, each of the client applications 32 has a corresponding user profile 40-1-40-N. The user profile 40-1 is a dynamic data structure that changes over time, and includes information that identifies, for example, previous content purchases 42 made via the client application 32-1, a browsing history 44 of the client application 32-1, previous content accessed 46 of the client application 32-1, and previous content watched 48 via the client application 32-1. User profiles 40-2-40-N contain similar information for client applications 32-2-32-N, respectively. Because the preferred processing task 30 has a finite amount of time to generate content recommendations, in this example, 30 ms, the preferred processing task 30 may divide the maximum preferred processing amount of time 38 (i.e., 30 ms) by the number of recommendations that need to be generated, to determine how long the preferred processing task 30 may analyze the user profiles 40 for each content recommendation. Generally, the preferred processing task 30 generates better recommendations with longer processing times. After the preferred processing task 30 generates the recommendations, the mandatory processing task 28 may then send the recommendations to the client applications 32.

The server application 26 then determines the amount of time taken by the mandatory processing task 28 to perform the mandatory processing this iteration of the processing workload, and modifies the moving average of mandatory processing task times 36, as identified by iteration B. In this example, the moving average of mandatory processing task times 36, after iteration A, now has a value of 72 ms.

If the total amount of time elapsed since the beginning of iteration A is less than the target timeframe 34 (i.e., 100 ms), the server application 26 waits until 100 ms have elapsed. Input requests received from the client applications 32 during iteration A have been queued (e.g., buffered) for processing in the successive iteration. The server application 26 then again implements the processing workload that includes the mandatory processing task 28 and the preferred processing task 30.

The mandatory processing task 28 accesses the queued input messages received from the client applications 32 during iteration A. The moving average of mandatory processing task times 36 now has a value of 72 ms. The mandatory processing task 28 first implements the desired operation requested from each client application 32. The server application 26 then determines that the maximum preferred processing task amount of time 38 that the preferred processing task 30 may process during iteration B is 28 ms based on the difference between the target timeframe 34 (100 ms) and the moving average of mandatory processing task times 36 at iteration IB (72 ms).

The preferred processing task 30 then, for each of the input messages received from the client applications 32, generates a content recommendation. Because the preferred processing task 30 has less time in iteration B to generate content recommendations, the generated recommendations may not be as good as were generated in iteration A when the preferred processing task 30 had a greater amount of time (i.e., 2 ms greater) to generate content recommendations. After the preferred processing task 30 generates the recommendations, the mandatory processing task 28 may then send the recommendations to the client applications 32. The server application 26 repeats this process indefinitely.

In this manner, the server application 26 ensures that requests from the client applications 32 are timely processed, and that the content recommendation processing can take as long as possible to ensure the best recommendation possible, while staying within or at least not greatly exceeding the target timeframe 34.

Figure 2:
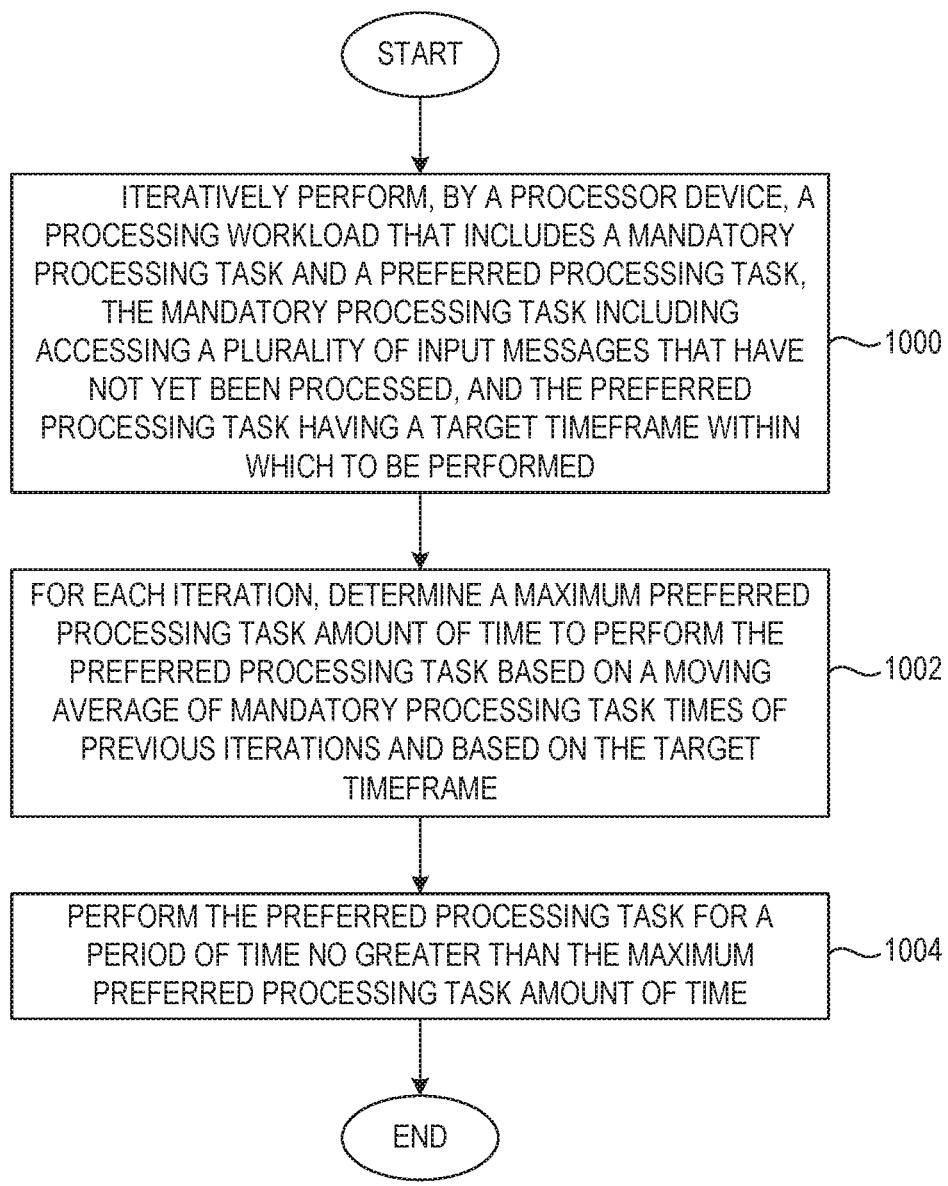
FIG. 2 is a flowchart of a method for iterative workload processing having a mandatory processing task and a preferred processing task according to one implementation.

FIG. 2 is a flowchart of a method for iterative workload processing having a mandatory processing task and a preferred processing task according to one implementation. FIG. 2 will be discussed in conjunction with FIG. 1. The central computing device 12 iteratively performs, by the processor device 18, a processing workload that includes the mandatory processing task 28 and the preferred processing task 30. The mandatory processing task 28 includes accessing a plurality of input messages that have not yet been processed, and the preferred processing task 30 has target timeframe 34 within which to be performed (FIG. 2, block 1000). For each iteration, the central computing device 12 determines a maximum preferred processing task amount of time 38 to perform the preferred processing task 30 based on a moving average of mandatory processing task times 36 of previous iterations and based on the target timeframe 34 (FIG. 2, block 1002). The central computing device 12 performs the preferred processing task 30 for a period of time no greater than the maximum preferred processing task amount of time 38.

Figure 3:
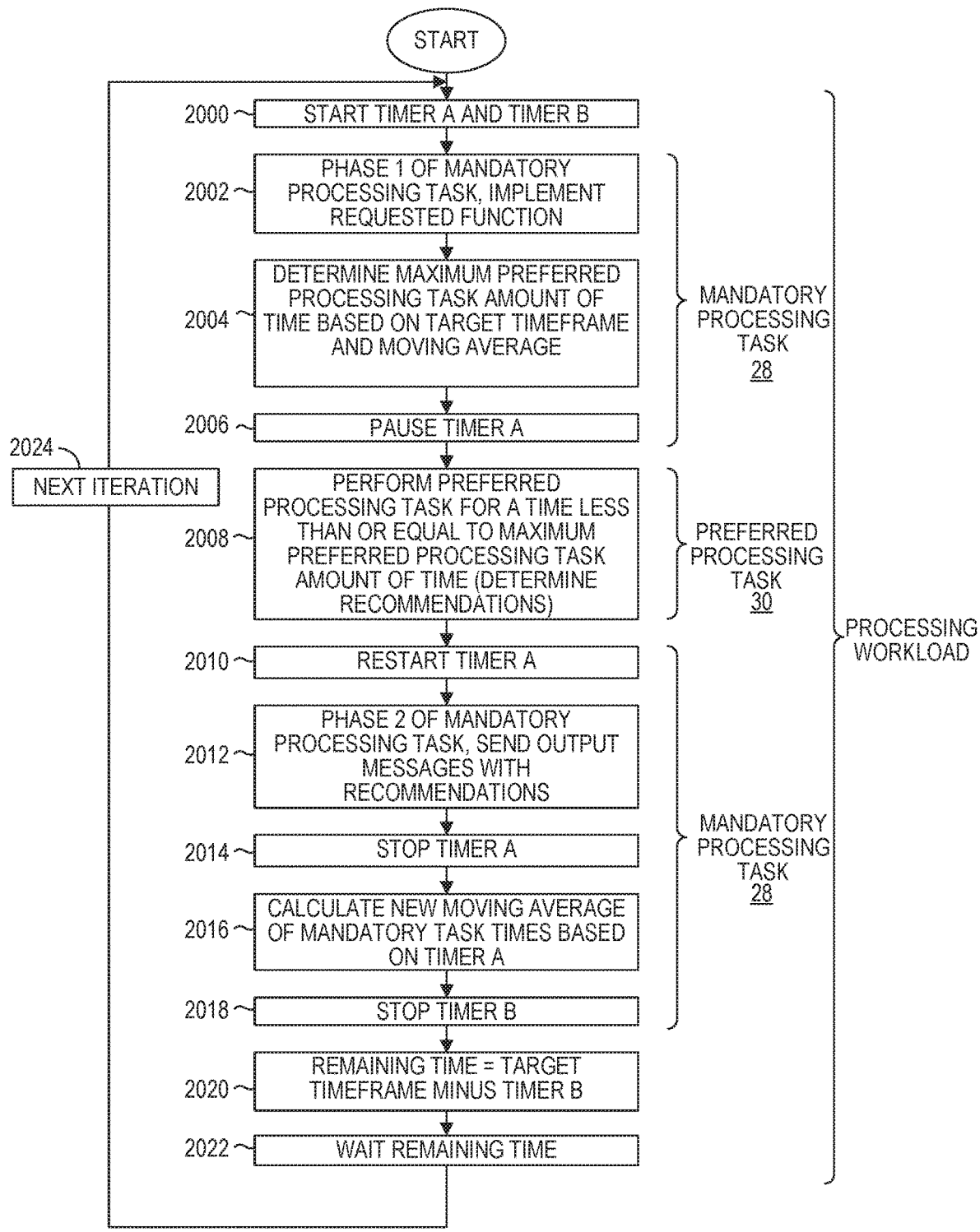
FIG. 3 is a flowchart of the method for iterative workload processing having the mandatory processing task and the preferred processing task illustrated in FIG. 2, in greater detail.

FIG. 3 is a flowchart of the method for iterative workload processing having a mandatory processing task and a preferred processing task illustrated in FIG. 2 in greater detail, according to one implementation. FIG. 3 will be discussed in conjunction with FIG. 1. At the beginning of iteration A, the processor device 18 starts a timer A and a timer B (FIG. 3, block 2000). The processor device 18 then implements a phase 1 of the mandatory processing task 28 (FIG. 3, block 2002). Phase 1 involves first accessing any unprocessed input messages received from the client computing devices 14. Generally, the unprocessed input messages comprise those input messages received during the previous iteration of the processing workload. The processor device 18 then implements the desired operations requested in the input messages. After the desired operations are implemented, the processor device 18 determines the maximum preferred processing task amount of time 38 that the preferred processing task 30 may execute during iteration A, by determining the difference between the target timeframe 34 (100 ms) and the current value of the moving average of mandatory processing task times 36 at iteration A (70 ms) (FIG. 3, block 2004). The processor device then pauses the timer A (FIG. 3, block 2006).

The processor device 18 then performs the preferred processing task 30 for a period of time equal to or less than the maximum preferred processing task amount of time 38 (FIG. 3, block 2008). Specifically, the processor device 18, for each of the input messages received from the client applications 32, generates a content recommendation. The processor device 18 then restarts the timer A and begins implementing phase 2 of the mandatory processing task 28 (FIG. 3, blocks 2010-2012). In particular, the processor device 18 utilizes the recommendations generated by the preferred processing task 30 and sends output messages to the client computing devices 14 with the recommendations.

The processor device 18 then stops the timer A (FIG. 3, block 2014). The processor device 18 then calculates a new moving average of mandatory processing task times 36 based on the value of the timer A (FIG. 3, block 2016). In particular, the moving average of mandatory processing task times 36 is based on some number of previous iterations, such as 10, 20, 50, 100, or some other value. If, for example, the moving average of mandatory processing task times 36 is based on the previous 50 iterations, the processor device 18 inserts the value of the timer A at the top of a list of previous mandatory task times, and then takes the average of the top 50 values on the list to determine the moving average of mandatory processing task times 36.

The processor device 18 then stops the timer B (FIG. 3, block 2018). The timer B contains the amount of time that has transpired since the beginning of the iteration. The processor device 18 determines a remaining amount of time by determining the difference between the target timeframe 34 and value of the timer B (FIG. 3, block 2020). The processor device 18 waits the remaining amount of time, and then begins the next iteration of the processing workload (FIG. 3, blocks 2022-2024).

Figure 4:
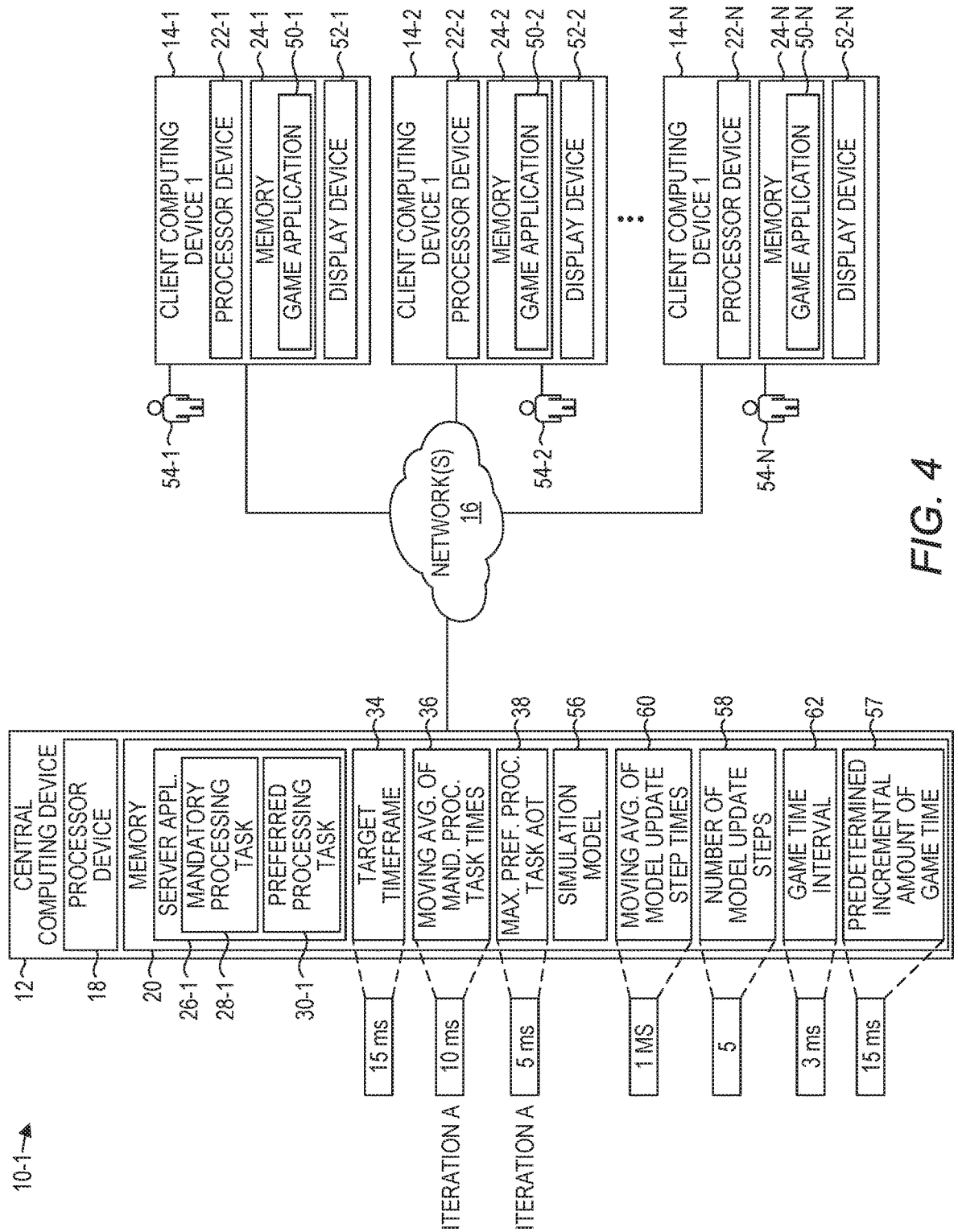
FIG. 4 is a block diagram of an environment in which an additional implementation may be practiced.

FIG. 4 is a block diagram of an environment 10-1 in which another implementation may be practiced. The environment 10-1 is substantially similar to the environment 10, except as discussed otherwise herein. In this implementation a server application 26-1 implements a game server of a client-server game. The client computing devices 14-1-14-N include client game applications 50-1-50-N (generally, client game applications 50), respectively. In some implementations, the client computing devices 14 may comprise game console devices, such as a Microsoft® Xbox® game console, Sony® PlayStation® game console, Nintendo® Switch® game console, or the like. In other implementations, the client computing devices 14 may comprise general purpose computing devices that execute the client game applications 50.

The client computing devices 14 each include, or are communicatively coupled to display devices 52-1-52-N (generally, display devices 52). Users 54-1-54-N (generally, users 54) interacting with the client game applications 50-1-50-N manipulate one or more virtual objects in the game and thereby affect what is presented on the display devices 52. Each client game application 50 continuously sends messages to the server application 26-1 that identify events caused by a corresponding user 54 in the virtual world, such as movements of a corresponding virtual object, firing of a weapon, or the like.

The server application 26-1 iteratively, approximately 60 times a second, performs a processing workload that comprises a mandatory processing task 28-1 and a preferred processing task 30-1 each iteration. The processing workload has a target timeframe 34 of 15 ms. The target timeframe 34 of 15 ms may facilitate a 60 frame per second refresh rate for the client computing devices 14. The mandatory processing task 28-1 includes processing all unprocessed messages received from the client game applications 50, and generating output messages based on the input messages that were processed during the respective iteration. The preferred processing task 30-1 includes updating a simulation model 56 each iteration based on the input messages.

Figure 5A:
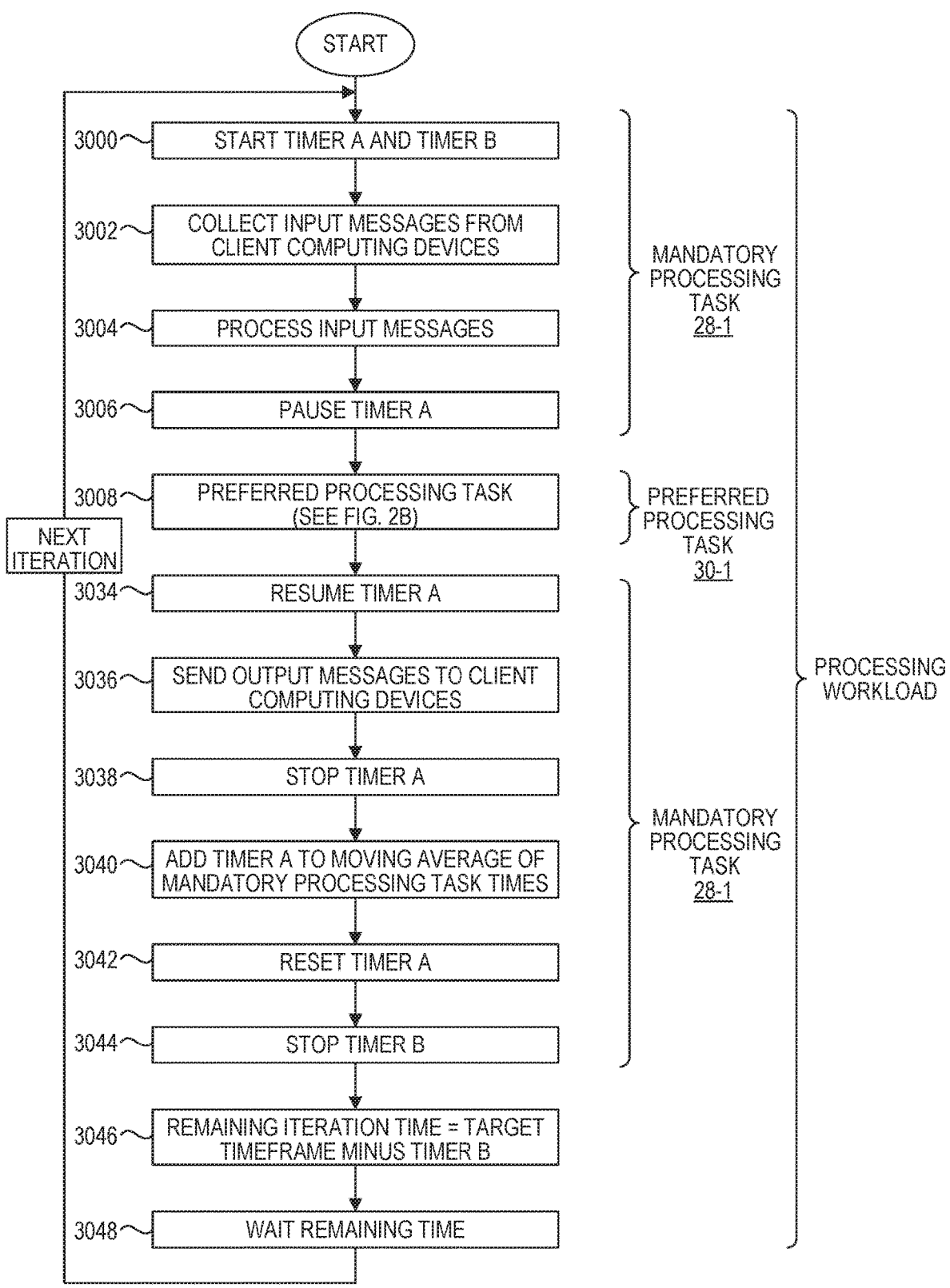
FIGS. 5A-5B are a flowchart of iterative workload processing implemented in the environment illustrated in FIG. 4, according to one implementation.
Figure 5B:
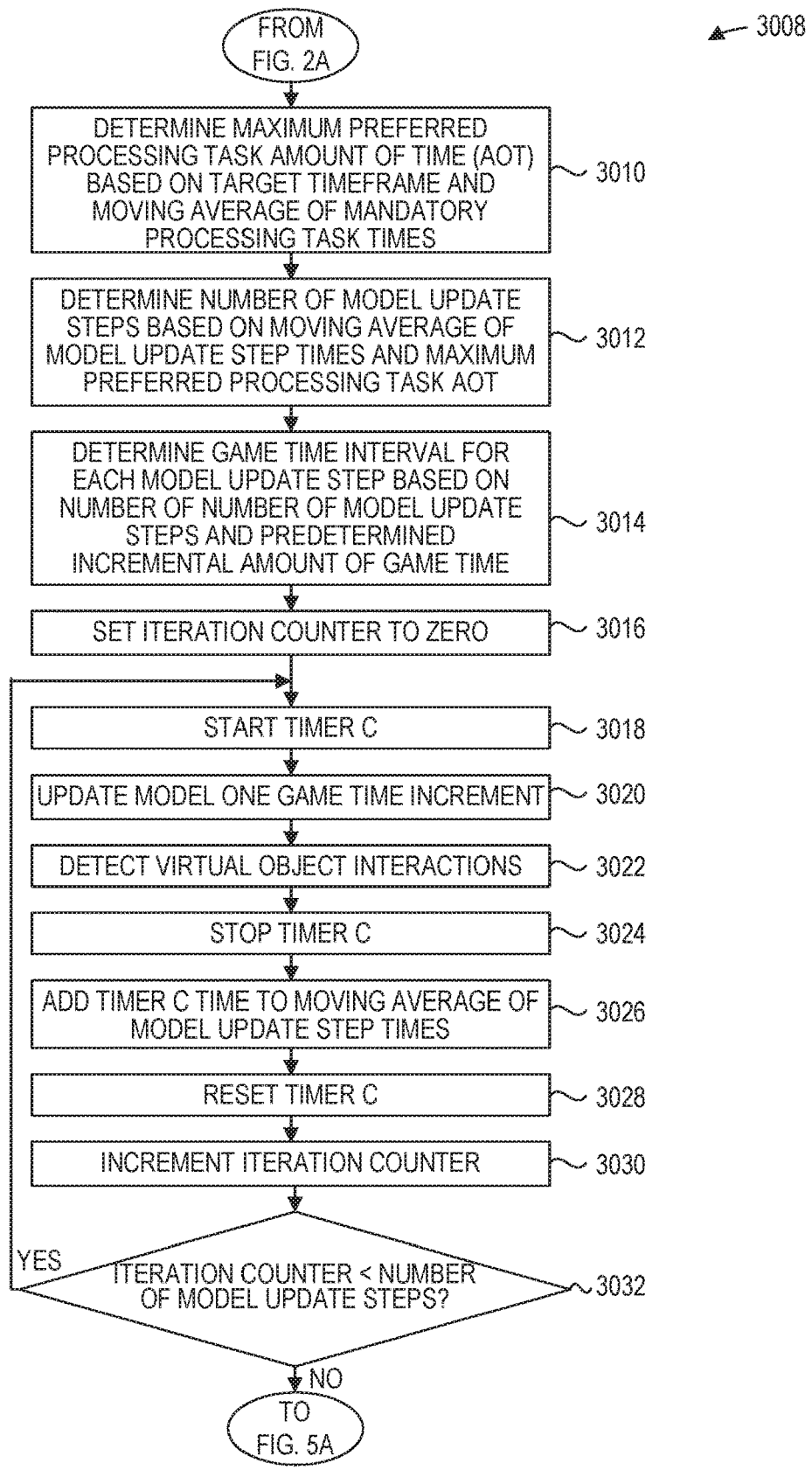

FIGS. 5A-5B are a flowchart of iterative workload processing implemented in the environment 10-1 according to one implementation. FIGS. 5A-5B will be discussed in conjunction with FIG. 4. At the beginning of an iteration A, the mandatory processing task 28-1 starts a timer A and a timer B (FIG. 5A, block 3000). The timer A, as discussed in greater detail below, will be used to track the amount of time of the mandatory processing task 28-1, and the timer B will be used to track the total amount of time of the mandatory processing task 28-1 and the preferred processing task 30-1.

The mandatory processing task 28-1 collects and processes the unprocessed input messages (FIG. 5A, blocks 3002-3004). The unprocessed input messages, for example, are the messages received from the client computing devices 14 that were not processed during the previous iteration. The mandatory processing task 28-1 will process each input message irrespective of the quantity of input messages. Such processing may include, by way of non-limiting example, updating data structures based on the content of the input messages, conversion of input messages from one format to another format, and/or translation of an action by a participant to a command, such as an activation of an input button by a player to the command "Move player A to the right".

After the input messages have been processed, the mandatory processing task 28-1 pauses the timer A (FIG. 5A, block 3006). The preferred processing task 30-1 is then performed (FIG. 5A, block 3008). Referring now to FIG. 5B, the preferred processing task 28-1 determines the maximum preferred processing task amount of time 38 based on the target timeframe 34 and the moving average of mandatory processing task times 36 (FIG. 5B, block 3010). In this example, the moving average of mandatory processing task times 36 at the time of iteration A is 10 ms, and the target timeframe 34 is 15 ms, and thus the maximum preferred processing task amount of time 38 is 5 ms.

The preferred processing task 30-1, during the maximum preferred processing task amount of time 38 (i.e., 5 ms), updates the simulation model 56. Updating the simulation model 56 involves advancing the simulation model 56 a predetermined incremental amount of game time 57. In this implementation, the preferred processing task 30-1 updates the simulation model 56 an interval of 15 ms in game time so that, to the users 54, the virtual world in which they are participating advances in time generally in realtime with real world time.

The input messages received by the server application 26-1 identify the actions taken by the users 54 and that must be implemented in the simulation model 56 over that 15 ms period of time. However, from a game physics calculations perspective, it is advantageous to update the simulation model 56 in as small of game time intervals as possible to increase the accuracy of the algorithms that identify the effect of movements of the virtual objects in the virtual world. Such effects may include, for example, collisions between virtual objects in the virtual world, such as a collision of a virtual object bullet with a virtual object avatar. Moving virtual objects smaller distances and then detecting collisions is more accurate than moving virtual objects greater distances and then detecting collisions. Thus, larger game time intervals result in lesser accuracy, and smaller game time intervals result in greater accuracy. Larger game time intervals, for example, may result in missing a collision between two virtual objects that would be detected with smaller game time intervals. Each game time interval is implemented by a single model update step by the preferred processing task 30-1. The total number of model update steps that can be performed by the preferred processing task 30-1 for any given iteration of the processing workload depend on the amount of real-world time it takes the preferred processing task 30-1 to perform a model step update and the maximum preferred processing task amount of time 38.

The preferred processing task 30-1 maintains a moving average of model update step times 60 that identifies the average amount of real-world time needed to implement a model step update over the previous X number of iterations. X can be predetermined value, such as 10, 50, 100 or the like. In order to determine a number of model update steps 58 that can be implemented during this processing workload iteration, the preferred processing task 30-1 divides the maximum preferred processing task amount of time 38 (in this example, 5 ms) by the current value of the moving average of model update step times 60 (in this example, 1 ms) (FIG. 5B, 3012). Note that in some implementations a "relax factor", such as 0.5, 0.7, or the like, may be used to reduce the number of model update steps 58 to build in a buffer of time to account for unexpected events, to help ensure that the overall duration of time required to implement the processing workload does not exceed the target timeframe 34. In some implementations, the result of dividing the maximum preferred processing task amount of time 38 by the current value of the moving average of model update step times 60 may be multiplied by the relax factor to determine the number of model update steps 58.

In this example, the number of model update steps 58 is 5. Thus, the preferred processing task 30-1 can perform five model update steps 58. The preferred processing task 30-1 then determines a game time interval 62 by dividing the predetermined incremental amount of game time 57 (i.e., 15) by the number of model update steps 58 (i.e., 5) (FIG. 5B, 3014). Thus, for this iteration of the processing workload, the game time interval 62 is 3 ms.

Note that the greater the value of the maximum preferred processing task amount of time 38, the greater the number of model update steps 58 that can be taken, and the greater the amount of collision detection accuracy while updating the simulation model 56. However, the examples disclosed herein ensure that even if a large number of input messages need to be processed, or if the server application 26-1 is otherwise busy processing other game-related tasks, the examples still ensure a response to the client computing devices 14 within a timeframe close to the target timeframe 34, albeit with less collision detection accuracy, eliminating widely varying responses to the client computing devices 14 irrespective of widely varying loads on the server application 26-1.

The preferred processing task 30-1 sets an iteration counter to a value of zero (FIG. 5B, 3016). The preferred processing task 30-1 starts a timer C (FIG. 5B, 3018). The preferred processing task 30-1 then updates the simulation model 3 ms in game time (FIG. 5B, 3020), and performs appropriate physics calculations on the simulation model to detect changes, such as interactions between virtual objects, based on the 3 ms game time interval (FIG. 5B, 3022). The results of this process will ultimately be communicated to the client game applications 50 so that the client game applications 50 can present imagery depicting the results in the virtual world.

The preferred processing task 30-1 then stops the timer C (FIG. 5B, 3024). The preferred processing task 30-1 modifies the moving average of model update step times 60 based on the value of the timer C (FIG. 5B, 3026). The preferred processing task 30-1 resets the timer C (FIG. 5B, 3028). The preferred processing task 30-1 increments the iteration counter, and checks whether the iteration counter is equal to the model update steps 58 (FIG. 5B, 3028). If so, then the preferred processing task 30-1 has finished moving the simulation model 56 forward the predetermined incremental amount of game time 57, and is finished. If not, then the preferred processing task 30-1 returns to block 3018 to repeat the process and update the simulation model 56 an additional 3 ms of game time.

After the preferred processing task 30-1 has finished moving the simulation model 56 forward the predetermined incremental amount of game time 57, control returns to block 3034 of FIG. 5A. The server application 26-1 resumes the timer A (FIG. 5A, block 3034). The mandatory processing task 28-1 sends messages to the client computing devices 14 that identify changes to the virtual world as determined by the preferred processing task 30-1 (FIG. 5A, block 3036). The server application 26-1 stops the timer A, and modifies the moving average of mandatory processing task times 36 based on the value of the timer A (FIG. 5A, blocks 3038-3040). The server application 26-1 resets the timer A and stops the timer B (FIG. 5A, blocks 3042-3044). The timer B identifies the amount of time that has elapsed since the beginning of the processing workload. In this implementation it is preferred that the duration of the processing workload be close to the target timeframe 34 prior to starting the next iteration. Thus, the server application 26-1 determines a remaining iteration by subtracting the value of the timer B from the target timeframe 34, and waits an amount of time equal to the remaining time prior to starting the next iteration of the processing workload (blocks 3046-3048).

Figure 6:
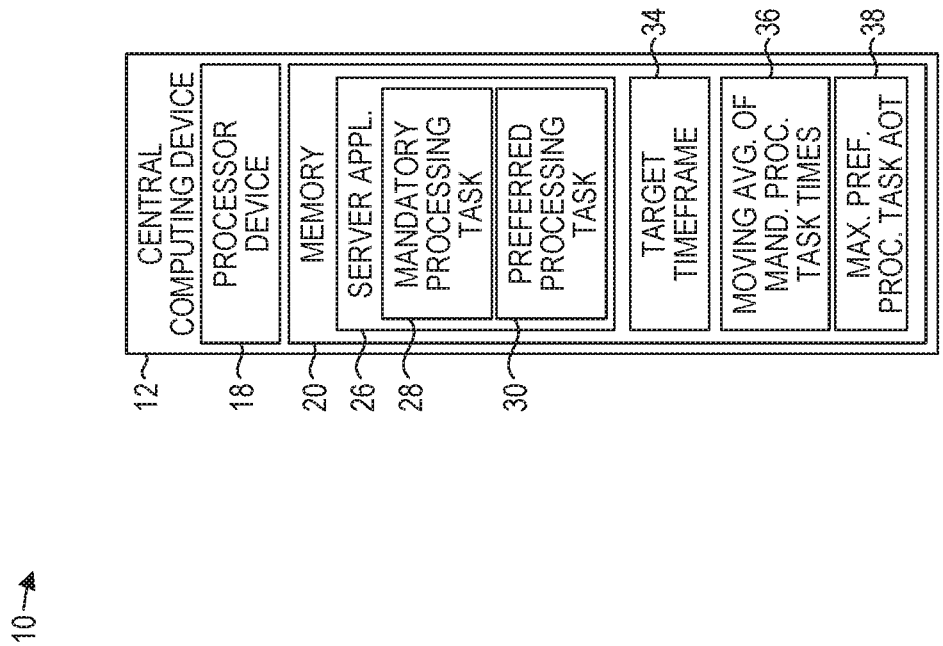
FIG. 6 is a simplified block diagram of the environment illustrated in FIG. 1 according to one implementation.

FIG. 6 is a simplified block diagram of the environment 10 illustrated in FIG. 1 according to one implementation. FIG. 6 includes the central computing device 12, which in turn includes the memory 20 and the processor device 18 communicatively coupled to the memory 20. The processor device 18 is to iteratively perform a processing workload that comprises the mandatory processing task 28 and the preferred processing task 30. The mandatory processing task 28 includes accessing a plurality of input messages that have not yet been processed, and the preferred processing task 30 has the target timeframe 34 within which to be performed.

For each iteration, the processor device 18 determines the maximum preferred processing task amount of time 38 to perform the preferred processing task 30 based on the moving average of mandatory processing task times 36 of previous iterations and based on the target timeframe 34. The processor device performs the preferred processing task 30 for a period of time no greater than the maximum preferred processing task amount of time 38.

Figure 7:
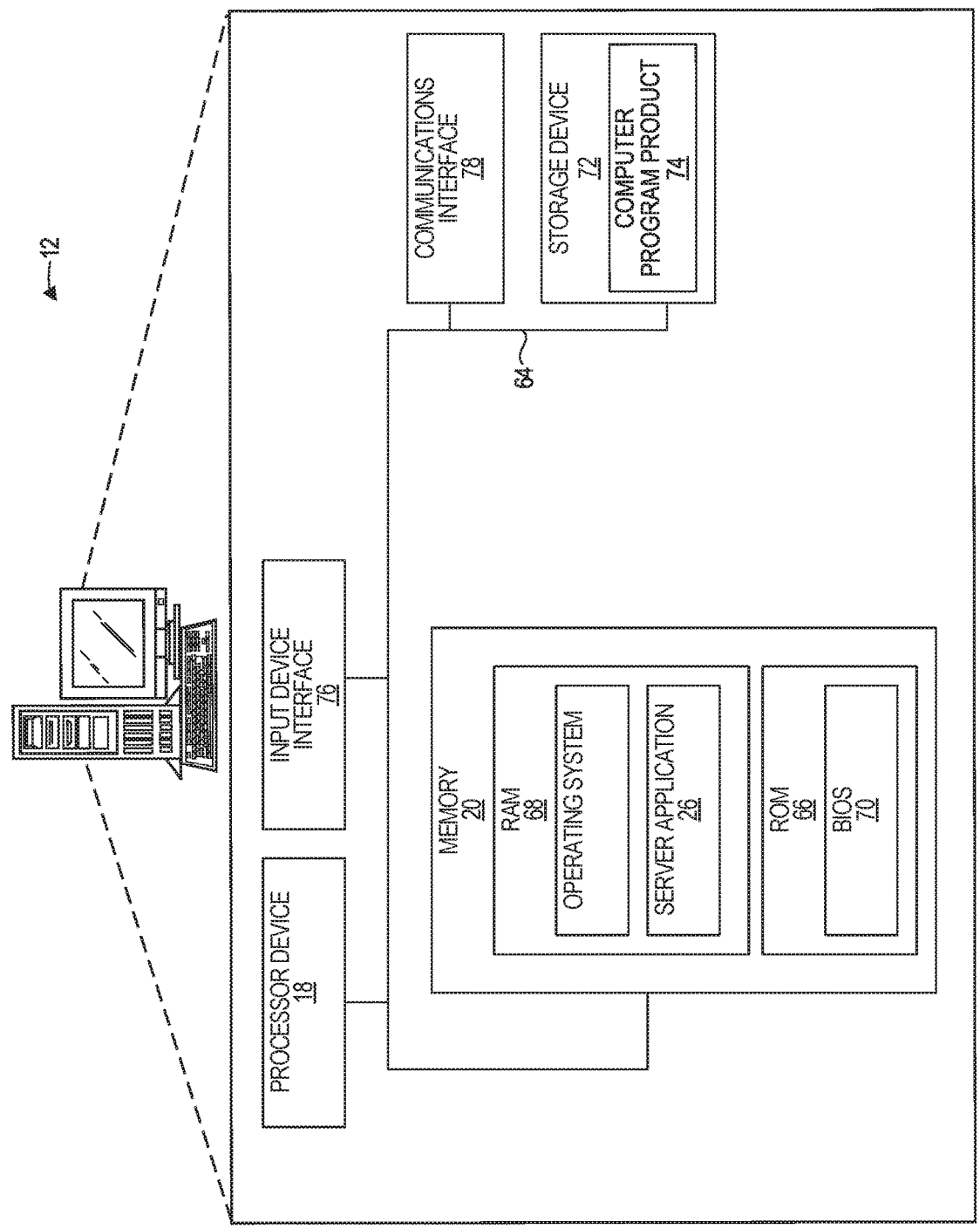
FIG. 7 is block diagram of a central computing device suitable for implementing examples disclosed herein.

FIG. 7 is a block diagram of the central computing device 12 suitable for implementing examples according to one example. The central computing device 12 may comprise any computing or electronic device capable of including firmware, hardware, and/or executing software instructions to implement the functionality described herein, such as a computer server, a desktop computing device, a laptop computing device, a smartphone, a computing tablet, a gaming console, or the like. The central computing device 12 includes the processor device 18, the system memory 20, and a system bus 64. The system bus 64 provides an interface for system components including, but not limited to, the system memory 20 and the processor device 18. The processor device 18 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 20 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the central computing device 12. The volatile memory 68 may also include a high-speed RAM, such as static RAM, for caching data.

The central computing device 12 may further include or be coupled to a non-transitory computer-readable storage medium such as a storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 72 and in the volatile memory 68, including an operating system and one or more program modules, such as the server application 26, which may implement the functionality described herein in whole or in part.

All or a portion of the examples may be implemented as a computer program product 74 stored on a transitory or non-transitory computer-usable or computer-readable storage medium, such as the storage device 72, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The processor device 18, in conjunction with the server application 26 in the volatile memory 68, may serve as a controller, or control system, for the central computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 18 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like.

The central computing device 12 may also include a communications interface 78, such as an Ethernet transceiver, suitable for communicating with the one or more networks 16, as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    iteratively performing, by a processor device of a central computing device communicatively coupled to a plurality of client computing devices via one or more networks, a processing workload that comprises a mandatory processing task and a preferred processing task, the mandatory processing task comprising accessing a plurality of input messages received from a client computing device from among the plurality of client computing devices that have not yet been processed, and the preferred processing task having a target timeframe within which to be performed;
    for each iteration, determining, by the processor device of the central computing device, a maximum preferred processing task amount of time to perform the preferred processing task based on a moving average of mandatory processing task times of previous iterations and based on the target timeframe; and
    performing, by the processor device of the central computing device, the preferred processing task for a period of time no greater than the maximum preferred processing task amount of time.

2. The method of claim 1 wherein the mandatory processing task further comprises sending output messages in response to the plurality of input messages, the mandatory processing task taking an amount of time that varies based on a quantity of the plurality of input messages; and wherein the preferred processing task comprises determining the output messages based on the input messages and a dynamic data structure that changes over time.

3. The method of claim 1 wherein the processor device is to iteratively perform the processing workload at least 10 iterations per second.

4. The method of claim 3 wherein the preferred processing task is configured to have a higher accuracy rate of identifying collisions between virtual objects as a function of an amount of time given to perform the preferred processing task.

5. The method of claim 1 further comprising:
during each iteration:
determining an amount of time taken to perform the mandatory processing task; and
updating a moving average of mandatory processing task times with the amount of time taken to perform the mandatory processing task.

6. The method of claim 1 wherein performing the preferred processing task for the period of time no greater than the maximum preferred processing task amount of time further comprises:
determining a model update step time based on a moving average of model update step times;
determining a number of model update steps based on the model update step time and the maximum preferred processing task amount of time; and
iteratively, for a number of iterations equal to the number of model update steps, performing a model update step process comprising:
accessing a simulation model that identifies a plurality of virtual objects;
based on the plurality of input messages, moving virtual objects identified in the simulation model forward an incremental amount of game time; and
determining whether any collisions occur between virtual objects in response to moving the virtual objects forward the incremental amount of game time.

7. The method of claim 6 further comprising:
during each iteration of performing the model update step process:
determining an amount of time taken to perform the model update step process; and
updating the moving average of model update step times with the amount of time taken to perform the model update step process.

8. The method of claim 1 wherein the processor device implements a game server of a client-server game, and wherein at least some of the plurality of input messages identify movements of virtual objects of the client-server game, the virtual objects being controlled by corresponding client computing devices participating in the client-server game, and wherein the preferred processing task is configured to detect collisions between the virtual objects based on the movements of the virtual objects identified in the at least some of the plurality of input messages.

9. The method of claim 8 further comprising:
generating, by the mandatory processing task based on the collisions detected by the preferred processing task, output messages that identify the collisions; and
sending the output messages that identify the collisions to the client computing devices.

10. A computing device, comprising:
a memory; and
a processor device coupled to the memory to:

iteratively perform, by an application server communicatively coupled to a plurality of client computing devices via one or more networks, a processing workload that comprises a mandatory processing task and a preferred processing task, the mandatory processing task comprising accessing a plurality of input messages received from a client computing device from among the plurality of client computing devices that have not yet been processed, and the preferred processing task having a target timeframe within which to be performed;
for each iteration, determine, by the application server, a maximum preferred processing task amount of time to perform the preferred processing task based on a moving average of mandatory processing task times of previous iterations and based on the target timeframe; and
perform, by the application server, the preferred processing task for a period of time no greater than the maximum preferred processing task amount of time.

11. The computing device of claim 10 wherein the mandatory processing task further comprises sending output messages in response to the plurality of input messages, the mandatory processing task taking an amount of time that varies based on a quantity of the plurality of input messages; and
wherein the preferred processing task comprises determining the output messages based on the input messages and a dynamic data structure that changes over time.

12. The computing device of claim 10 wherein the processor device is to iteratively perform the processing workload at least 10 iterations per second.

13. The computing device of claim 10 wherein the processor device is further to:
during each iteration:
determine an amount of time taken to perform the mandatory processing task; and
update a moving average of mandatory processing task times with the amount of time taken to perform the mandatory processing task.

14. The computing device of claim 10 wherein to perform the preferred processing task for the period of time no greater than the maximum preferred processing task amount of time, the processor device is further to:
determine a model update step time based on a moving average of model update step times;
determine a number of model update steps based on the model update step time and the maximum preferred processing task amount of time; and
iteratively, for a number of iterations equal to the number of model update steps, perform a model update step process comprising:
accessing a simulation model that identifies a plurality of virtual objects;
based on the plurality of input messages, moving virtual objects identified in the simulation model forward an incremental amount of game time; and
determining whether any collisions occur between virtual objects in response to moving the virtual objects forward the incremental amount of game time.

15. The computing device of claim 10 wherein the processor device implements a game server of a client-server game, and wherein at least some of the plurality of input messages identify movements of virtual objects of the client-server game, the virtual objects being controlled by corresponding client computing devices participating in the client-server game, and wherein the preferred processing task is configured to detect collisions between the virtual objects based on the movements of the virtual objects identified in the at least some of the plurality of input messages.

16. A computer program product stored on a non-transitory computer-readable storage medium and including computer-executable instructions to cause a processor device to:
   iteratively perform, by an application server communicatively coupled to a plurality of client computing devices via one or more networks, a processing workload that comprises a mandatory processing task and a preferred processing task, the mandatory processing task comprising accessing a plurality of input messages received from a client computing device from among the plurality of client computing devices that have not yet been processed, and the preferred processing task having a target timeframe within which to be performed;
   for each iteration, determine, by the application server, a maximum preferred processing task amount of time to perform the preferred processing task based on a moving average of mandatory processing task times of previous iterations and based on the target timeframe; and
   perform, by the application server, the preferred processing task for a period of time no greater than the maximum preferred processing task amount of time.

17. The computer program product of claim 16 wherein the mandatory processing task further comprises sending output messages in response to the plurality of input messages, the mandatory processing task taking an amount of time that varies based on a quantity of the plurality of input messages; and
   wherein the preferred processing task comprises determining the output messages based on the input messages and a dynamic data structure that changes over time.

18. The computer program product of claim 16 wherein the instructions further cause the processor device to:
   during each iteration:
      determine an amount of time taken to perform the mandatory processing task; and
      update a moving average of mandatory processing task times with the amount of time taken to perform the mandatory processing task.

19. The computer program product of claim 16 wherein to perform the preferred processing task for the period of time no greater than the maximum preferred processing task amount of time, the instructions further cause the processor device to:
   determine a model update step time based on a moving average of model update step times;
   determine a number of model update steps based on the model update step time and the maximum preferred processing task amount of time; and
   iteratively, for a number of iterations equal to the number of model update steps, perform a model update step process comprising:
      accessing a simulation model that identifies a plurality of virtual objects;
      based on the plurality of input messages, moving virtual objects identified in the simulation model forward an incremental amount of game time; and
      determining whether any collisions occur between virtual objects in response to moving the virtual objects forward the incremental amount of game time.

20. The computer program product of claim 16 wherein the instructions further cause the processor device to implement a game server of a client-server game, and wherein at least some of the plurality of input messages identify movements of virtual objects of the client-server game, the virtual objects being controlled by corresponding client computing devices participating in the client-server game, and wherein the preferred processing task is configured to detect collisions between the virtual objects based on the movements of the virtual objects identified in the at least some of the plurality of input messages.

* * * * *